United States Patent [19]
Gilling

[11] Patent Number: 5,761,629
[45] Date of Patent: Jun. 2, 1998

[54] METHOD AND APPARATUS FOR CRUISE CONTROL

[75] Inventor: Simon Peter Gilling, Castlethorpe, England

[73] Assignee: Lucas Industries Public Limited Company, Solihull, England

[21] Appl. No.: 567,984

[22] Filed: Dec. 11, 1995

[30] Foreign Application Priority Data

Dec. 13, 1994 [GB] United Kingdom ............... 9425096

[51] Int. Cl.$^6$ ........................................... G06F 165/00
[52] U.S. Cl. ........................ 701/96; 701/301; 180/169; 340/903
[58] Field of Search ................. 364/426.041, 426.044, 364/431.07, 460, 461; 180/167–169, 176–179; 123/352; 342/454, 455; 340/901, 903, 904, 435, 436

[56] References Cited

U.S. PATENT DOCUMENTS

| | | | |
|---|---|---|---|
| 4,757,450 | 7/1988 | Etoh | 180/169 |
| 4,833,469 | 5/1989 | Constant | 180/169 |
| 4,948,246 | 8/1990 | Shigematsu | 364/426.044 |
| 5,197,562 | 3/1993 | Toshiaki et al. | 180/169 |
| 5,388,048 | 2/1995 | Yavnayi et al. | 364/426.044 |
| 5,467,283 | 11/1995 | Butsuen | 364/426.044 |
| 5,467,284 | 11/1995 | Yoshioka et al. | 364/426.044 |
| 5,510,990 | 4/1996 | Hibino et al. | 364/426.044 |
| 5,529,139 | 6/1996 | Kurahashi et al. | 180/169 |
| 5,612,686 | 3/1997 | Takano et al. | 340/903 |

FOREIGN PATENT DOCUMENTS

| | | |
|---|---|---|
| 0 605104 | 7/1994 | European Pat. Off. |
| 0 612641 | 8/1994 | European Pat. Off. |
| 0 657857 | 6/1995 | European Pat. Off. |
| WO 80/01782 | 9/1980 | WIPO |

OTHER PUBLICATIONS

Ingenieurs de L'Automobile, No. 685, pp. 46–48, Nov./Dec. 1993, Christian Couston, "Les Regulateurs de Distance".

*Primary Examiner*—Gary Chin
*Attorney, Agent, or Firm*—Oblon, Spivak, McClelland, Maier & Neustadt, P.C.

[57] ABSTRACT

A cruise control system arranged to determine whether the closest targeted vehicle ahead of a vehicle being controlled is running in its lane or an adjacent lane and if it is determined that the closest vehicle is running in an adjacent slower lane, allowing the controlled vehicle to overtake the closest vehicle if the way ahead is clear, and if it is determined that the closest vehicle is running in an adjacent faster lane, selecting that closest vehicle as a prime target to control the acceleration of the controlled vehicle unless there is another vehicle running in the same lane as the controlled vehicle which requires deceleration of the controlled vehicle, in which case the vehicle running in the same lane is selected as the prime target.

4 Claims, 5 Drawing Sheets

METHOD AND APPARATUS FOR CRUISE CONTROL

The present invention relates to an apparatus for and method of cruise control for vehicles.

It is well known to provide cruise control facilities in a vehicle which allow the driver to set a target vehicle speed, the vehicle road speed being adjusted automatically by the cruise controller so as to maintain the actual vehicle speed at the target speed for as long as the cruise control is activated. Such known controllers do not monitor the distance to or speed of vehicles which lie ahead of the controlled vehicle, so that the driver must intervene if the vehicle under cruise control approaches too closely to a vehicle ahead of it, for example to ensure that a "safe" braking distance remains between the vehicles based on such factors as the driver's perception of the road conditions, weather conditions and vehicle performance. The driver intervention can involve adjusting the set target speed to a new target or at least temporarily switching off the cruise control altogether, for example by applying the vehicle foot brake or displacing a cruise control operating lever to an off position. In the case that a vehicle ahead increases its speed, the driver of the vehicle under cruise control also has the facility to manually adjust the target speed upwardly to a new target by actuation of the cruise control operating lever.

A recent development in cruise control has involved reducing the necessity for driver involvement by enabling the cruise control system to be aware of and react to the presence and performance of a vehicle, referred to hereinafter as a target vehicle, running ahead of the vehicle under cruise control. A system of this type, referred to as one having Autonomous Intelligent Cruise Control (AICC), is disclosed in our EP-A- 0 612 641 to which reference is hereby directed, wherein the cruise control apparatus comprises distance error determining means for determining a distance error as the difference between a desired distance between a target vehicle and the controlled vehicle and the actual distance between the target vehicle and the controlled vehicle, speed error determining means for determining a speed error as the difference between the speed of the target vehicle and the speed of the controlled vehicle, and acceleration demand producing means for producing a vehicle acceleration demand as a function of the distance error and of the speed error.

The acceleration demand can be calculated as the sum of the product of the distance error and a first gain parameter and the product of the speed error and a second gain parameter. The second gain parameter may be a constant, such as unity.

The distance and speed errors can be determined in a number of ways for example using an electro-magnetic or ultra-sonic target detection system, such as a radar system, for providing a direct measure of distance to a target vehicle ahead. The speed error can be obtained by differentiating the output of the radar system with respect to time. In other systems, the speed error may be formed automatically by the radar system, for example if the radar system is of the doppler type.

A preferred embodiment of the known system of EP-A- 0 612 641 also includes desired distance determining means for determining the desired distance as a function, for example a linear function, of the vehicle speed. It also preferably includes an acceleration error producing means for producing an acceleration error as the difference between the calculated acceleration demand and the actual vehicle acceleration.

The apparatus of EP-A- 0612 641 also includes a gating means for supplying the acceleration error to a vehicle drive system when the acceleration demand is greater than a first threshold ($\geq 0$), and for supplying the acceleration error to the vehicle brake system when the acceleration demand is less than the second threshold, the distance error is less than a second predetermined distance error ($<0$), and the speed error is less than a second predetermined speed error ($<0$).

Thus, a cruise control system of the type disclosed in our EP-A- 0 612 641 can determine the running speed of a controlled vehicle by reference to the relative speed and relative distance of a target vehicle which is running ahead of the controlled vehicle on the road. If the target vehicle increases its speed, then the controlled vehicle will increase its speed correspondingly, up to the preset target speed initially set by the driver. Likewise, if the target vehicle slows down, then the controlled vehicle will be caused to slow down as well, either by reduction in throttle or by a reduction in throttle and by application of the vehicle brakes. If the target vehicle comes to a halt, then the controlled vehicle will also be brought to a halt, a predetermined distance behind the target vehicle.

The aforegoing description of the known system assumes that the preceding (target) vehicle remains in the same driving lane as the controlled (AICC) vehicle, ie remains substantially directly in front of the controlled vehicle. In practice, of course, this situation does not always prevail and, for example in the case of driving on a multi-lane motorway, target vehicles in front of the AICC controlled vehicle may move to either an inside, slower lane or to an outside faster lane. In the case of motorways in the UK where one drives on the left-hand side of the road, this means that a target vehicle moving to an adjacent left-hand lane is moving to a slower lane and can be overtaken whereas a target vehicle moving to a right-hand lane is moving to a faster lane and therefor should not, in accordance with the prevailing regulations, be overtaken on the inside-unless in a slow moving "queuing situation".

It is an object of the present invention that the cruise control system (AICC) of a vehicle should be able to monitor lane changing manoeuvres of target vehicles running ahead and react appropriately.

In accordance with the present invention, there is provided an AICC cruise control system which is arranged to determine whether the closest targeted vehicle ahead of it is running in its lane or an adjacent lane and (a) if it is determined that the closest vehicle is running in an adjacent slower lane, to allow that vehicle to be overtaken if the way ahead is clear, (b) if it is determined that the closest vehicle is running in an adjacent faster lane, to prevent that vehicle from being undertaken and to use that vehicle as a prime target, unless there is another vehicle running in the same lane as the controlled vehicle which demands deceleration of the controlled vehicle in order to acquire station behind it, in which case the latter vehicle is selected to the prime target.

To achieve this operation, the AICC system preferably includes a means for establishing the angular offset of target vehicles running ahead of the controlled vehicle and for determining whether a given target vehicle is above, below or within a predetermined angular range of the direction of travel of the controlled vehicle, and a means for selecting a prime target from a plurality of targets detected by the radar system of the AICC, the selection means being arranged to operate such that:

(a) if the closest target vehicle is running below said predetermined angular range then that one of said targets having the highest acceleration demand from the AICC system is selected as the prime target to be followed unless the vehicle in the same lane demands deceleration (b) if the target vehicle is running within or above said predetermined angular range than that one of said targets having the lowest acceleration demand from the AICC system is selected as the prime target to be followed, unless (c) a more distant target running within said predetermined angular range requires deceleration to acquire station behind it, in which case the latter target is selected as the prime target to be followed.

The invention is described further hereinafter, by way of example only, with reference to the accompanying drawings, in which:

FIG. 1. is a block circuit diagram of one embodiment of a known cruise control apparatus to which the present invention is applicable;

Figure 1:
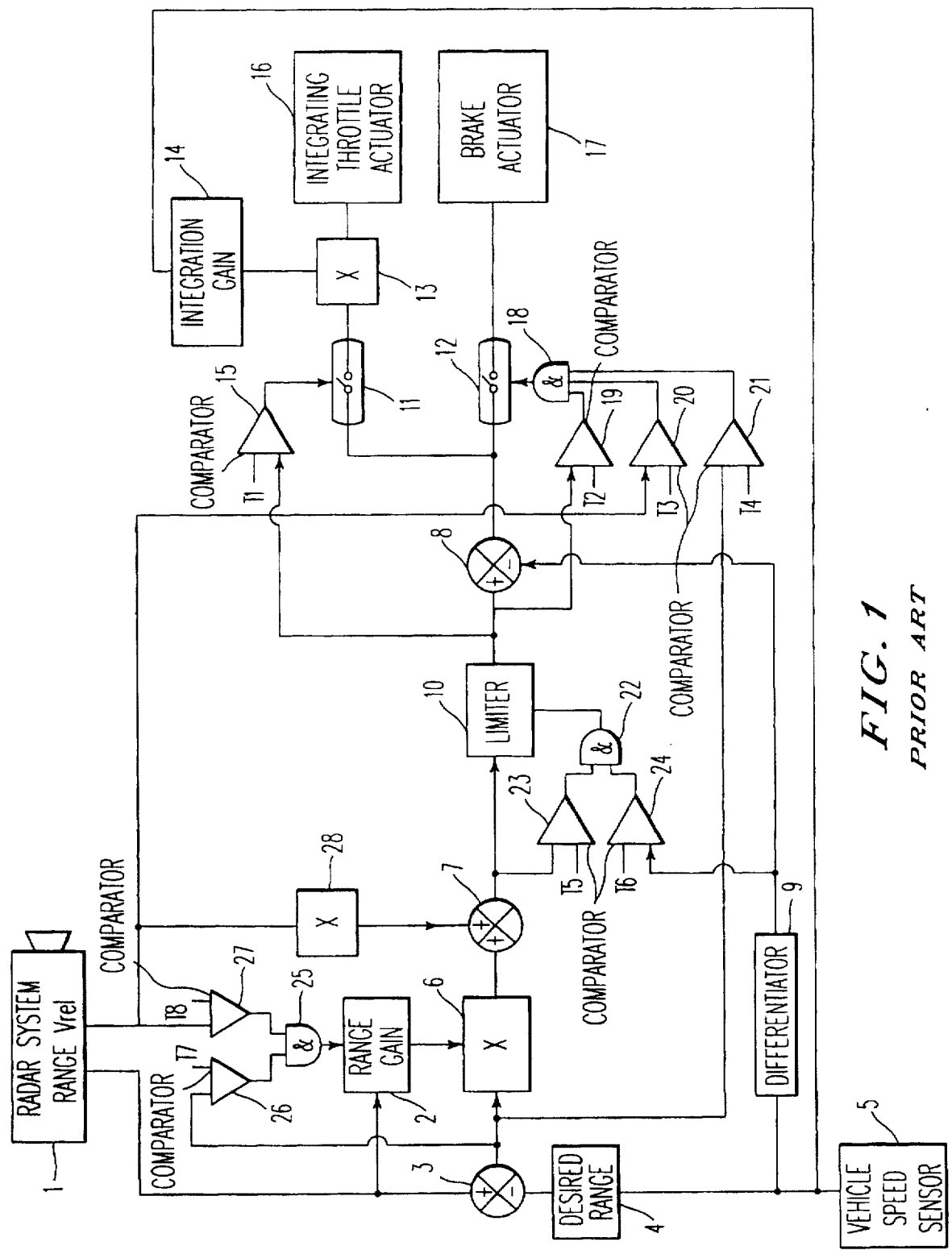

The cruise control apparatus of FIG. 1 is identical to that of our earlier EP-A- 0 612 641 and reference to that prior document is hereby directed for a full explanation of the illustrated system. Only those parts of the full description from EP-A- 0612 641 are included herein as are necessary for a basic understanding of the operation of the illustrated system.

The cruise control apparatus shown in FIG. 1 is provided in a vehicle driven by an internal combustion engine and comprises a radar system 1 which is mounted at the front of the vehicle and faces forwards so as to detect a further vehicle ahead of the vehicle. The radar system 1 provides a range output corresponding to the distance between the vehicle and the further vehicle and a relative speed output Vrel which corresponds to the difference in speeds of the vehicle and the further vehicle.

The range output of the radar system 1 is supplied to the adding input of a subtracter 3. The subtracting input of the subtracter 3 is connected to the output of a desired range setting circuit 4 whose input is connected to a vehicle speed sensor 5 for determining the speed of the vehicle. The sensor 5 may comprise any suitable sensor, such as an optical speed over ground sensor or a system for determining vehicle speed based on measurement of wheel speeds.

The output of the subtracter 3 is supplied to a first input of a multiplier 6 whose second input is connected to the output of a range gain setting circuit 2 having an input connected to the range output of the radar system 1. The output of the multiplier 6 is connected to a first input of an adder 7 whose second input is connected to the radar system 1 via a multiplier 28 so as to receive the relative speed signal. The multiplier is arranged to scale the relative speed signal prior to use by the adder 7. The multiplier 28 may be omitted if a gain of unity is applied to the relative speed signal. The output of the adder 7 is connected to the input or limiter 10 for limiting the maximum positive and negative values of the acceleration demand signal. For instance the maximum positive acceleration may be limited so as to be less than or equal to 15% g and the maximum deceleration may be limited so as to be less than or equal to 30% g, where g is acceleration due to gravity. The limited acceleration demand signal from the limiter 10 is supplied to the adding input of a subtracter 8 whose subtracting input is connected to the output of a differentiator 9. The input of the differentiator 9 is connected to the vehicle speed sensor so that the differentiator 9 provides a signal corresponding to the vehicle acceleration.

The output of the subtracter 8, which represents an acceleration error signal. is supplied to a gating arrangement comprising electronic switches 11 and 12. The switch 11 selectively connects the output of the subtracter 8 to a first input of a multiplier 13 whose second input is connected to the output of an integration gain setting circuit 14. The input of the circuit 14 is connected to the output of the vehicle speed sensor 5. The switch 11 is controlled by a comparator 15 having a first input connected to the output of the limiter 10 and a second input connected to receive a first threshold T1 which corresponds to an acceleration error which is normally greater than zero. The output of the multiplier 13 is connected to the input of a throttle actuator 16 of the internal combustion engine of the vehicle. The throttle actuator is of the type which controls the engine throttle in accordance with the integral with respect to time of the signal supplied thereto.

The switch 12 selectively connects the output of the subtracter 8 to a brake actuator 17 of the vehicle. The switch 12 has a control input connected to the output of an AND gate 18 having three inputs. The first input is connected to the output of a comparator 19 having a first input connected to the output of the limiter 10 and a second input connected to receive a threshold T2 corresponding to an acceleration which is less than zero. The second input of the gate 18 is connected to a comparator 20 having a first input connected to the radar system 1 so as to receive the relative speed signal and a second input connected to receive a threshold T3 corresponding to a relative speed or speed error which is less than zero. The third input of the gate 18 is connected to the output of a comparator 21 which has a first input connected to the output of the subtracter 3 so as to receive a range error signal and a second input connected to receive a threshold T4 corresponding to a range or distance error which is less than zero.

The limiter 10 has a disabling input for preventing the limiter from limiting the acceleration demand signal to the predetermined maximum limit value. The disabling input is connected to the output of an AND gate 22 which has two inputs. The first input of the gate 22 is connected to the output of a comparator 23 having a first input connected to the output of the adder 7 and a second input for receiving a threshold T5 corresponding to an acceleration demand which is equal to the maximum or upper limit value of the limiter. The second input of the gate 22 is connected to the output of a comparator 24 having a first input connected to the output of the differentiator 9 and a second input for receiving a threshold T6 corresponding to an acceleration between zero and the upper limit value.

The range gain setting circuit 2 has an input connected to the output of an AND gate 25 having two inputs. The first input of the gate 25 is connected to the output of a comparator 26 having a first input connected to the output of the subtracter 3 and a second input for receiving a threshold T7 corresponding to a predetermined distance error which is greater than zero. The second input of the gate 25 is connected to the output of a comparator 27 having a first input connected to receive the relative velocity signal from the radar system 1 and a second input for receiving a threshold T8 which corresponds to a predetermined speed error which is greater than zero.

When cruise control is selected, the cruise control apparatus shown in FIG. 1 controls the engine throttle and vehicle brake system automatically unless and until cruise control is disabled, for instance by the driver switching off cruise control or operating the accelerator or brake controls of the vehicle. The radar system 1 supplies range and relative speed signals corresponding to the distance between the vehicle and the closest other vehicle ahead of it and the difference between the speeds of the two vehicles. The range is supplied to the subtracter 3. The subtracter 3 forms a range error signal by subtracting the actual range from a desired range generated by the circuit 4. The circuit 4 sets the desired range as a function of the vehicle speed measured by the sensor 5. The circuit 4 may comprise a look-up table stored in a read only memory or a calculating circuit for calculating values of the function based on the vehicle speed. For instance, the desired range S may be determined in accordance with $$S=(0.23\times V)+7$$

where the desired range S is given in meters and V is the vehicle speed in kph.

In the absence of the constant 7 meters, the vehicle would be arranged to follow the further vehicle with a time separation of 0.83 seconds. However, for increased flexibility, the desired range setting circuit 4 may be controllable by the driver so as to select any time separation, and hence desired range, within predetermined limits, for instance of 0.8 and 2.5 seconds. The constant 7 meters ensures that, for relatively low speeds, the vehicle maintains a minimum spacing from the further vehicle ahead of it so that, for instance, if the further vehicle were to stop, the vehicle in cruise control would stop with a desired range sufficient to prevent a collision.

The range or distance error from the subtracter 3 is multiplied in the multiplier 6 by a range gain which is set in the circuit 2. The circuit 2 may comprise a look-up table stored in read only memory or means for calculating the range gain primarily as a function of the actual range or distance between the two vehicles. The range gain may, for example, have a maximum value of 7 for target ranges below 6 meters and a minimum value of 1 for target ranges above 20 meters. Between 6 and 20 meters, the range gain decreases monotonically and continuously or substantially continuously.

The output of the multiplier 6 is added to the speed error signal by the adder 7, that is, in this embodiment, the multiplier 28 has a gain of one. Thus for target ranges of 20 meters and above, the relatively low range gain of 1 is applied to the distance error and the speed error therefore has more influence on cruise control. Even with the relatively low range gain, if the distance error persists for a substantial time, the integral action of the throttle actuator 16 corrects the distance error smoothly.

For relatively small desired ranges, a quicker response to distance error is required and the gain is progressively increased for desired ranges below 20 meters until it reaches the maximum value of 7 at 6 meters and below. For such small desired ranges, any distance error represents a relatively large proportion of the desired range and a quick response is required in order to remove the distance error and, for instance, prevent the vehicle from approaching too closely the further vehicle ahead of it.

Thus, for relatively small desired ranges, the distance error has substantially more influence than the speed error in controlling the vehicle.

When the output of the gate 25 is active, a signal is supplied to the second input of the circuit 2 which causes the circuit to halve the range gain set in accordance with the function. The comparator 26 detects when the distance error is relatively great so that the vehicle under cruise control is relatively far behind the vehicle ahead of it. The comparator 27 determines when the speed error is such that the vehicle under cruise control is closing on the vehicle ahead of it. Thus, when the controlled vehicle is closing but is relatively far behind the lead vehicle, the range gain is halved so as to prevent overshoot.

The gating arrangement comprising the switches 11 and 12 the comparator 15 and the comparator 19 via the gate 18 ensure that positive acceleration demands control the engine throttle whereas negative acceleration demands control the vehicle brake. The thresholds T1 and T2 may be made substantially equal to zero or may be made positive and negative, respectively, by predetermined amounts so as to provide a "dead band" between throttle control and brake control.

The output of the adder 7 represents an acceleration demand signal which itself could be used to control acceleration of a vehicle by being suitably processed and applied, for instance to the throttle actuator 16 and the brake actuator 17. However, in order to provide closed loop control of acceleration, the acceleration demand is compared with the actual vehicle acceleration in the subtracter 8 to form an acceleration error. The acceleration demand from the adder 7 is limited by the limiter 10 to a maximum value of +15% g and a minimum value of −30% g. These maximum values of acceleration and deceleration have been found to be advantageous for the comfort of passengers in the vehicle.

The aforegoing description of the known system of FIG. 1 assumes that the preceding (target) vehicle remains in the same driving lane as the controlled (AICC) vehicle, ie remains substantially directly in front of the controlled vehicle. In practice, of course, this situation does not always prevail and, for example in the case of driving on a multi-lane motorway, target vehicles in front of the AICC controlled vehicle may move to either an inside, slower lane or to an outside faster lane. In the case of motorways in the UK where one drives on the left-hand side of the road, this means that a target vehicle moving to an adjacent left-hand lane is moving to a slower lane and can be overtaken whereas a target vehicle moving to a right-hand lane is moving to a faster lane and therefore should not, in accordance with the prevailing regulations, be overtaken on the inside-unless in a slow moving in a "queuing situation".

Figure 2A:
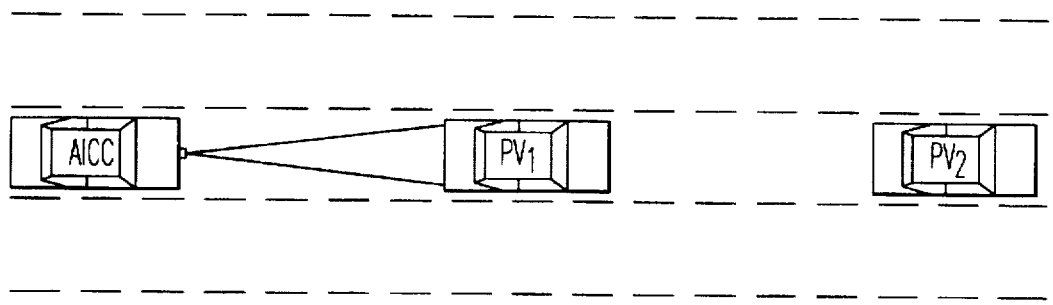
FIGS. 2 and 3 illustrate various running conditions encountered in practice.
Figure 2B:
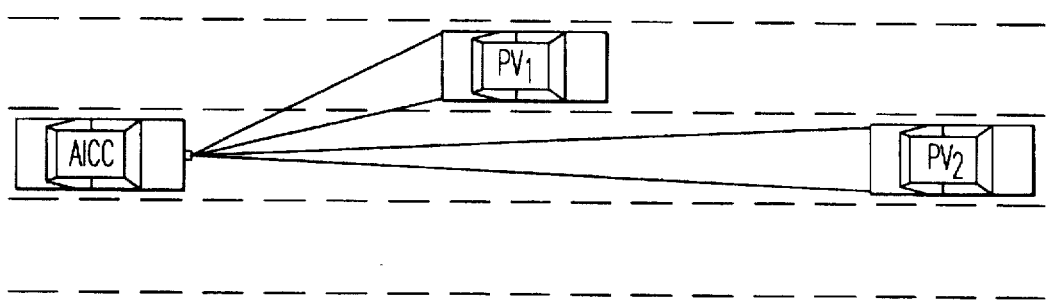
Figure 2C:
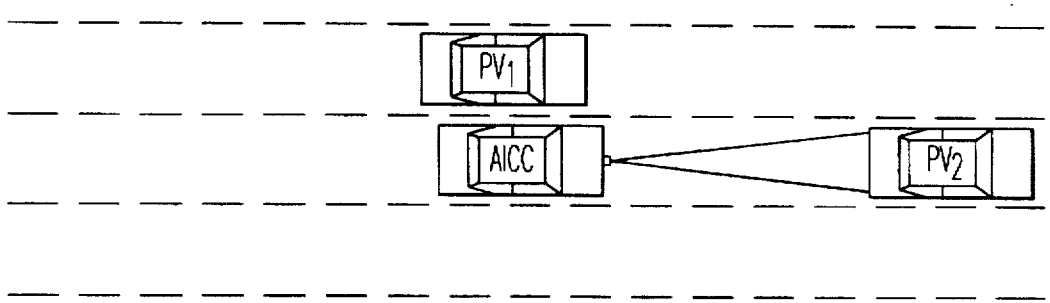

The situation is shown in FIG. 2(a) where a controlled (AICC) vehicle is running behind a first (target) preceding vehicle (PV1), both vehicles being in the same intermediate motorway lane. A second vehicle PV2 is running ahead of the vehicle PV1. If in this situation the preceding vehicle PV1 moves to the left into a slower lane (FIG. 2b), PV1 can then be ignored and the AICC vehicle can pick up the second vehicle PV2 as its target and, if the control system so decides, can overtake the vehicle PV1 (FIG. 2c).

Figure 3A:
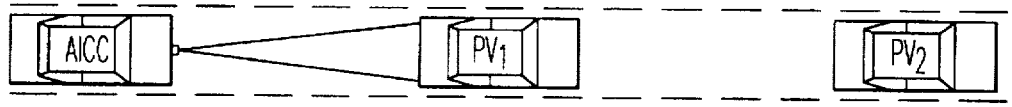
Figure 3B:
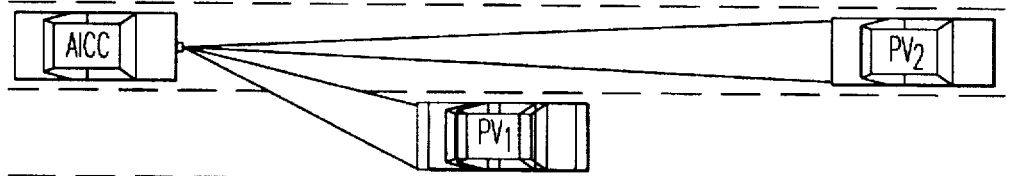
Figure 3C:
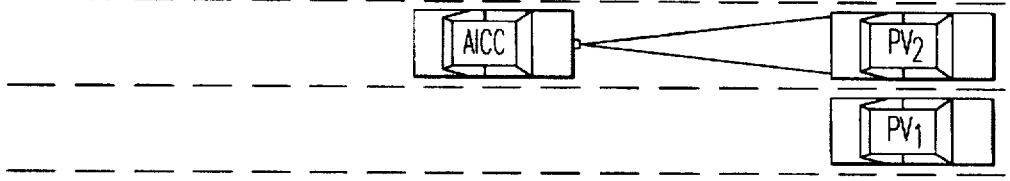

FIG. 3(b), on the other hand, shows the situation where a preceding vehicle PV1 which has been running ahead of the controlled vehicle (AICC) (FIG. 3a) moves to the right into a faster lane. In this case, the cruise control system in the AICC vehicle must continue to respond to the performance of vehicle PV1 and, although it must also monitor the next vehicle in its own lane (PV2) it should not follow PV2 to the extent as to undertake PV1 on the left (which would be an illegal move in the UK under present legislation). On the other hand, if the monitored motion of PV2 requires, the AICC vehicle may have to be decelerated to a suitable station behind PV2, in which case PV2 should be followed.

Figure 4:
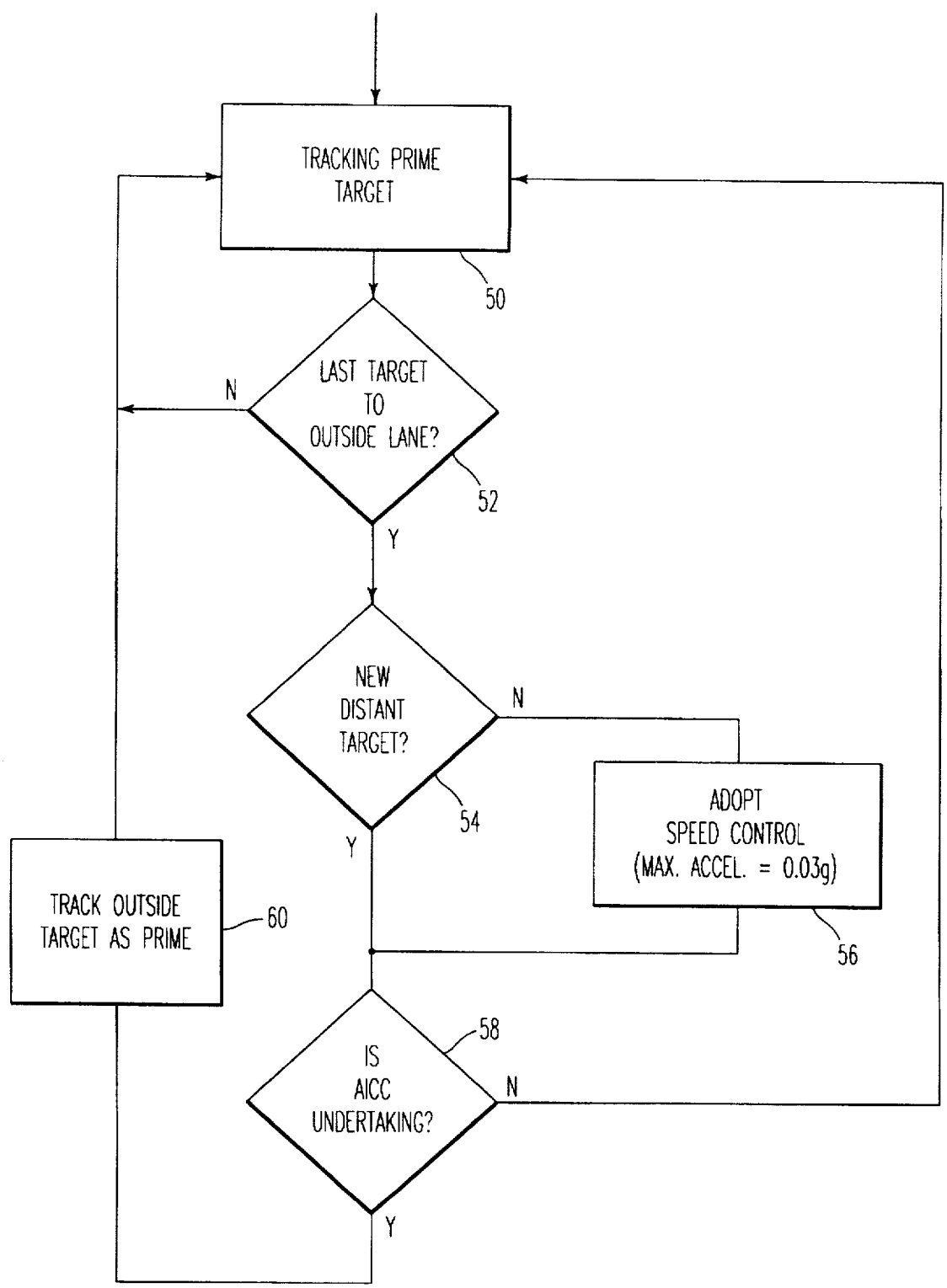
FIG. 4 is a simplified flow diagram of one embodiment or a control system in accordance with the present invention.

FIG. 4 shows a basic flow diagram of a system for achieving the latter operation for responding to the target moving to a faster lane. At the starting step 50 it is assumed that the controlled (AICC) vehicle is tracking a prime target (PV1) running in front of it. A periodic check is made at 52 as to whether or not the target has been lost to an outside lane. If it has not, then the AICC vehicle continues to track the original prime target. If the original target has moved to an outside lane, then the system looks at 54 for a new far target in its own lane. If there is no such target, then speed control is re-adopted at 56, subject to the usual predetermined maximum acceleration limits (+0.03 g in this case). If there is such a far target then the system checks at 58 whether by following this far target it will be caused to undertake the original target in the faster lane. If it will not need to undertake, then the far target is adopted as the new prime target (PV1) and the system returns to step 50. On the other hand, if following the far target will cause undertaking of the original target, then the system selects at 50 to continue to track the original target, as the prime target and ignore the far target—unless the position and speed of the far target requires deceleration of the AICC vehicle, in which case the far target overrides.

Figure 5:
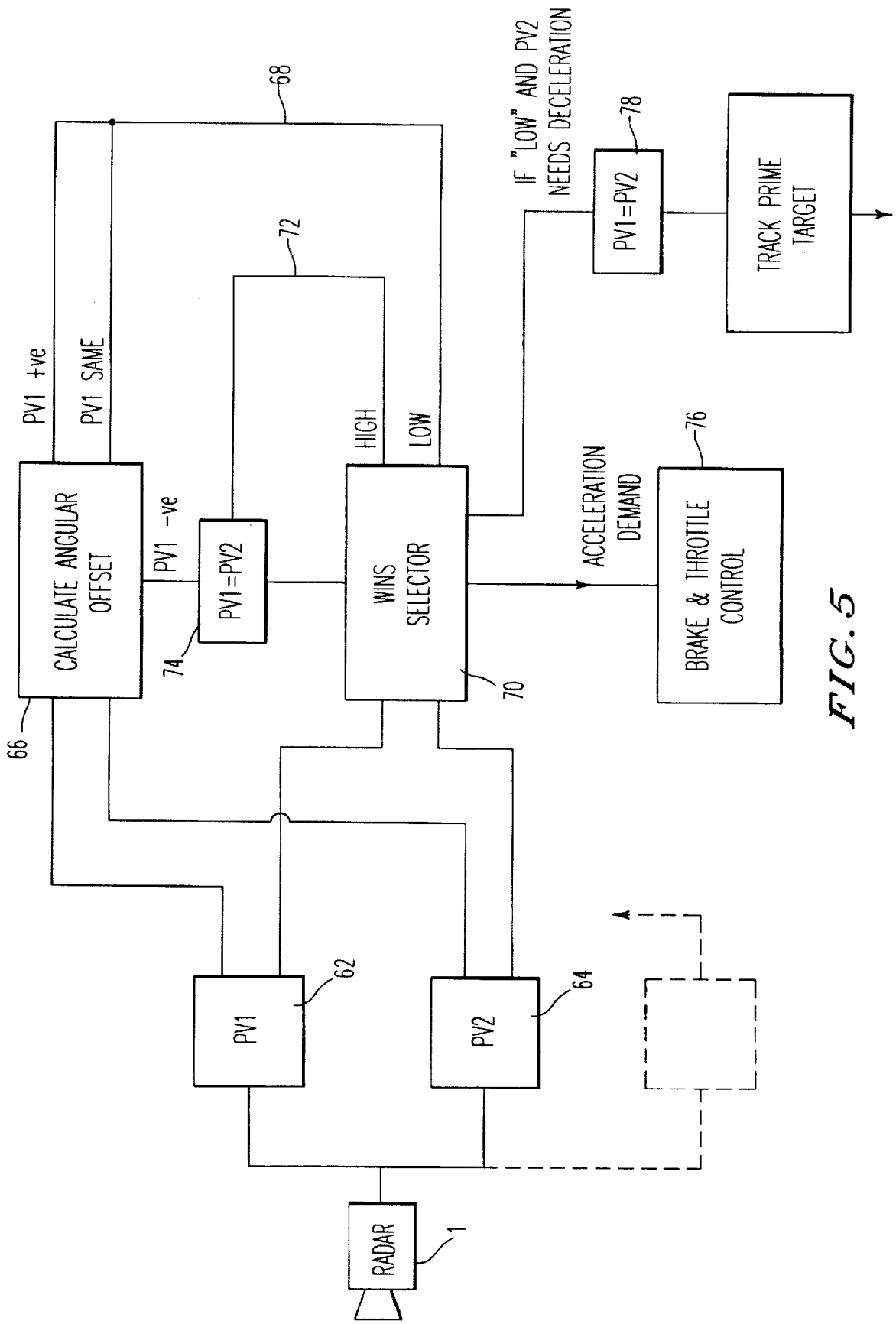
FIG. 5 is a block diagram of a basis working embodiment of a control system in accordance with the present invention.

A block diagram of one possible system for achieving this "auto acquire" operation is shown in FIG. 5.

The radar apparatus 1 is able, in addition to determining range and relative velocity of vehicles, to give information as to the angle at which a target is located relative to the AICC vehicle and a calculation can be made from the information which will identify in which lane a target vehicle is located. In very rough terms, for example, if the measured angle to a target vehicle lies in the range ±2°, then it can be assumed that the target is running in the same lane as the AICC vehicle. If the measured angle is less than −2° or more than +2° then it can be assumed that the target is running in the slower lane or the faster lane, respectively.

FIG. 5 shows the radar 1 providing its input to a first detector 62 responsive to a prime (closest) target (PV1) and a second detector 64 which is responsive to a secondary (next closest) target (PV2). The outputs from the detectors 62, 64 are passed to an angular offset calculation means 66 which establishes whether (a) the angle of PV1 to PV2 is more than +2° (PV1 is in a faster lane), (b) the angle of PV1 to PV2 is less than −2° (PV1 is in a slower lane) or (c) the angle of PV1 to PV2 lies within −2° to +2° (PV1 and PV2 are in the same lane).

In the event of condition (a), a signal is provided on a line 68 to a "select low" input of a "wins" selector means 70. In the event of condition (c), a signal is again provided on the line 68 to select a low input of the "wins" selector means 70. In the event of condition (b), a signal is provided on a line 74 to cause PV1 to be ignored and PV2 to become the target PV1 and to activate the "select high" input of the "wins" selector 70 via a line 72. The "wins" selector 70 is also arranged to receive the outputs of the detectors 62, 64. In the event that its "select low" input is activated, the wins selector 70 selects as the principal target to be followed by the AICC system that one of PV1 and PV2 giving the least acceleration demand. On the other hand, in the event that its "select high input" is activated, the wins selector 70 selects as the principal target to be followed by the AICC system that one of PV1 and PV2 giving the most acceleration demand. The selected target is then applied to the system of FIG. 1 as that which is to be followed and the brake/throttle control system 76 (those elements downstream of the subtracter 8 in FIG. 1) is operated accordingly. If the "select low" input of the wins selector 70 is activated and PV2 requires deceleration to achieve proper station of the AICC vehicle, then PV1 is made equal to PV2 at 78 and PV2 is then tracked as the prime target.

The aforegoing system is described in terms of vehicles running under regulations in the UK and Japan where vehicles run on the left-hand side of the road and where, on multi-lane roads, the slowest lane is on the left and the fastest on the right. Naturally, for vehicles which are to run under regulations where vehicles run on the right-hand side of the road, the system will need to be adjusted accordingly. For example, a manual control can be included to switch the system from operation on the left to the right and vice versa. Alternatively, or in addition, the system can be adapted to switch automatically to operate with driving on the left or right hand side of the road.

What is claimed is:

1. A cruise control system comprising:

a controlled vehicle controlled by the cruise control system;

detecting means for detecting vehicles ahead of the controlled vehicle;

distance measuring means measuring an actual distance from the controlled vehicle to any detected vehicle ahead of the controlled vehicle;

speed determining means determining an actual controlled vehicle speed of the controlled vehicle and an actual vehicle speed of any detected vehicle ahead of the controlled vehicle;

distance error determining means which determine a distance error as a difference between a desired predetermined vehicle separation distance and the actual distance measured;

speed error determining means which determine a speed error as a difference between the actual controlled vehicle speed and the actual vehicle speed of a detected vehicle ahead of the controlled vehicle;

acceleration demand means which determine a positive or negative acceleration demand signal as a function of the distance error received by the acceleration demand means and of the speed error received by the acceleration demand means;

vehicle lane determining means determining which lane vehicles detected ahead of the controlled vehicle are in and providing a lane indicating output;

first selection control means receiving said lane indicating output and providing a first selection of a prime target vehicle as a closest same lane vehicle when an actual closest vehicle is in a slower lane than the controlled vehicle which permits the actual closest vehicle in the slower lane to be overtaken; and second selection control means receiving said lane indicating output and providing a second selection of the prime target vehicle as the actual closest vehicle when the actual closest vehicle is in the same lane as or a faster lane than the controlled vehicle, said second selection resulting in monitoring of vehicles sharing the same lane ahead of said control vehicle by the second selection control means when the actual closest vehicle selected as said prime target vehicle is in said faster lane, said monitoring resulting in the closest vehicle in the same lane ahead of the controlled vehicle being selected by the second selection control means as the prime target vehicle when said monitoring indicates that a predetermined distance to the closest vehicle in the same lane ahead of the controlled vehicle has been reached.

2. A cruise control system comprising:

a controlled vehicle controlled by the cruise control system;

detecting means for detecting vehicles ahead of said controlled vehicle;

distance measuring means measuring an actual distance from the controlled vehicle to any vehicle detected ahead of the controlled vehicle;

speed determining means determining an actual controlled vehicle speed of the controlled vehicle and an actual vehicle speed of a detected vehicle ahead of the controlled vehicle;

distance error determining means which determine a distance error as a difference between a desired predetermined vehicle separation distance and the actual distance measured;

speed error determining means which determine a speed error as a difference between the actual controlled vehicle speed and the actual vehicle speed of a detected vehicle ahead of the controlled vehicle;

acceleration demand means which determine a positive or negative acceleration demand signal as a function of the distance error received by the acceleration demand means and of the speed error received by the acceleration demand means;

wherein said detecting means further comprises,
  a plurality of vehicle detectors, and
  angular offset calculation means responsive to the detectors to determine an angular offset of each vehicle ahead of the controlled vehicle and to determine each detected vehicle as being above, below or within a predetermined angular range in a direction of travel of said controlled vehicle; and prime target vehicle selection means selecting a prime target vehicle from the vehicles detected by the plurality of vehicle detectors, said prime target selection means making a first selection of a vehicle having an angular position within the said predetermined angular range as the prime target vehicle when the vehicle within the predetermined angular range has a negative acceleration demand signal and is within a predetermined distance of the controlled vehicle, said prime target selection means making a second selection of a vehicle having a greatest acceleration demand signal value among the detected vehicles as the prime target vehicle when an actual closest vehicle is detected to be at an angular position below said predetermined angular range and when no vehicle having an angular position within the predetermined angular range is detected as also having a negative acceleration demand signal and as being within the predetermined distance of the controlled vehicle, said prime target selection means making a third selection of a vehicle having a least acceleration demand signal value among the detected vehicles as the prime target vehicle when an actual closest vehicle is detected to be at an angular position within or above said predetermined angular range and when no vehicle having an angular position within the predetermined angular range is detected as also having a negative acceleration demand signal and as being within the predetermined distance of the controlled vehicle.

3. A cruise control system comprising:

a controlled vehicle controlled by the cruise control system;

detecting means for detecting vehicles ahead of said controlled vehicle;

distance measuring means measuring an actual distance from the controlled vehicle to any detected vehicle ahead of the controlled vehicle;

speed determining means determining an actual controlled vehicle speed of the controlled vehicle and an actual vehicle speed of any detected vehicle ahead of the controlled vehicle;

distance error determining means which determine a distance error as a difference between a desired predetermined vehicle separation distance and the actual distance measured;

speed error determining means which determine a speed error as a difference between the actual controlled vehicle speed and the actual vehicle speed of a detected vehicle ahead of the controlled vehicle;

acceleration demand means which determine a positive or negative acceleration demand signal as a function of the distance error received by the acceleration demand means and of the speed error received by the acceleration demand means;

wherein said detecting means further comprises,
  a plurality of vehicle detectors, including first detectors detecting a first closest target vehicle and second detectors detecting a second next closest target vehicle, and
  angular offset calculating and indicating means receiving outputs from the first and second detectors and calculating an angle between a direction of the first closest target vehicle and a direction of the second next closest target vehicle and outputting a first indicating signal when the calculated angle is more than a first predetermined value, outputting a second indicating signal when the calculated angle is less than a second predetermined value, and outputting a third indicating signal when the calculated angle lies between the first and second predetermined values;

prime target vehicle selection means receiving the first, second, and third indicating signals from the angular offset calculating and indicating means and using said received indicating signals at least in part in selecting a prime target vehicle from the vehicles detected to be ahead of the controlled vehicle by the plurality of vehicle detectors.

4. The cruise control system of claim 3, wherein the prime target vehicle selection means includes a selector having first and second inputs, the first input being connected to receive the first and third indicating signals which cause the selector to select a first detector detected vehicle or a second detector detected vehicle as the prime target vehicle based upon which one of the first detector detected vehicle and the second detector detected vehicle has an acceleration demand signal of a lesser value as determined by the acceleration demand means, and the second input being connected to receive the second indicating signal which causes the selector to select a first detector detected vehicle or a second detector detected vehicle as the prime target vehicle based upon which one of the first detector detected vehicle and the second detector detected vehicle has an acceleration demand signal of a greater value as determined by the acceleration demand means.

* * * * *